United States Patent [19]
Abe et al.

[11] Patent Number: 6,042,757
[45] Date of Patent: Mar. 28, 2000

[54] INJECTION-MOLDING APPARATUS AND METHOD OF INJECTION-MOLDING

[75] Inventors: Masaharu Abe; Shigeru Takaragi; Hiroshi Yamamoto; Kyoichi Nakamura; Osamu Sasaki, all of Otake, Japan

[73] Assignee: Toda Kogyo Corporation, Japan

[21] Appl. No.: 09/084,921

[22] Filed: May 28, 1998

[30] Foreign Application Priority Data

May 29, 1997 [JP] Japan ................................. 9-157552

[51] Int. Cl.[7] .......................... B29C 45/42; B29C 45/72
[52] U.S. Cl. .................. 264/28; 264/328.8; 264/328.14; 264/334; 264/336; 425/548; 425/556
[58] Field of Search ................................. 264/28, 297.2, 264/328.1, 328.8, 328.14, 334, 336, 427, 429; 425/547, 548, 554, 555, 556, 436 R, 436 RM, 444

[56] References Cited

U.S. PATENT DOCUMENTS

| | | | |
|---|---|---|---|
| 4,209,290 | 6/1980 | Rees et al. | 425/547 |
| 4,246,225 | 1/1981 | Ninneman | 264/336 |
| 4,514,166 | 4/1985 | Ichizawa et al. | 264/336 |
| 4,836,767 | 6/1989 | Schad et al. | |
| 5,181,971 | 1/1993 | Ohtsuka | 264/429 |
| 5,384,957 | 1/1995 | Mohri et al. | 29/895.32 |
| 5,453,224 | 9/1995 | Kuroda | 264/427 |
| 5,514,309 | 5/1996 | Williamson et al. | 264/336 |
| 5,570,167 | 10/1996 | Kuroda | 264/108 |
| 5,653,934 | 8/1997 | Brun, Jr. et al. | 264/334 |

FOREIGN PATENT DOCUMENTS

| | | |
|---|---|---|
| 0 283 644 | 9/1988 | European Pat. Off. . |
| 0 718 084 A2 | 6/1996 | European Pat. Off. . |

*Primary Examiner*—Jill L. Heitbrink
*Attorney, Agent, or Firm*—Nixon & Vanderhye

[57] ABSTRACT

An injection-molding device including an injection machine, a mold unit connected to the injection machine having separable molds defining a cavity for forming a molded product, and chucks next to the mold unit for removing a molded product from the mold. The molded product is initially cooled in the mold cavity then again cooled after removal from the mold unit. Plural chucks are advanced into and retreated from a region defined by the open molds, the chucks being a pair of blocks grasping the surface of the molded product, each block having a circulating path through which a heating medium is passed to cool the grasping surface. The injection-molding apparatus produces articles having high dimensional accuracy, for example, electronic parts such as a magnet roll or the like.

9 Claims, 5 Drawing Sheets

INJECTION-MOLDING APPARATUS AND METHOD OF INJECTION-MOLDING

BACKGROUND OF THE INVENTION

The present invention relates to an injection-molding apparatus and a method of injection-molding, and more particularly, to an injection-molding apparatus for forming a molded product from a molding material comprising a thermoplastic resin and an inorganic filler, which is capable of not only reducing costs for production facilities and shortening an injection-molding cycle time, thereby achieving a high productivity, but also effectively preventing deformation of the molded product, and a method for injection-molding a molding material comprising a thermoplastic resin and an inorganic filler using such an apparatus.

The injection-molding apparatus and method of injection-molding according to the present invention are useful for the production of such articles required to have a high dimensional accuracy, for example, electronic parts such as a magnet roll or the like.

In general, molded products such as magnet rolls have been produced by subjecting a molding material comprising a thermoplastic resin such as a polyamide resin or the like and an inorganic filler such as ferrite particles or iron oxide particles to an injection-molding process. A molding cycle of such an injection-molding cycle comprises steps of clamping, injecting, dwelling, cooling, mold-opening and removing the molded product from the mold. In the production of magnet roll, etc., these molded products have been required to have a high dimensional accuracy. On the other hand, various methods for reducing the time required for conducting the above-mentioned steps, especially a cooling step, have been studied in order to achieve a high productivity.

Meanwhile, in the above-mentioned production, if the cooling time in the mold is shortened, the molded product cannot be sufficiently cooled in the mold before its removal. This causes internal strain of the molded product generated upon injection-molding to be released, so that the molded product undergoes deformation such as warpage or bend. In addition, there have been proposed a method of shortening the cooling time by lowering the temperature of the mold. However, in the case where the temperature of the mold is too low, a resin flowing on an inner surface of the mold is abruptly solidified upon injection thereof, so that generation of strain in the molded product is further promoted.

Therefore, there has been recently proposed a method of shortening a molding cycle time, which method is called "OCI (Outside Cooling Injection)" (refer to the magazine "PLASTICS" Vol. 45, No. 45, pp. 37–41(1994) and Japanese Patent Application Laid-open (KOKAI) No. 7-9498 (1995)). In the OCI method, there have been used two molds (A and B), and a resin is first injected into the mold A and then into the mold B. That is, (1) after completion of the injection at the mold A, the resin is injection-molded in the mold B. (2) During the injection in the mold B, a molded product obtained at the mold A is cooled and removed therefrom. (3) After completion of the injection at the mold B, the resin is injected again into a vacant cavity of the mold A. According to the OCI method, the above-mentioned molding operations are repeated alternately at the molds A and B, thereby ensuring a sufficient cooling time and enhancing a productivity of molded products.

However, in the OCI method, at least two identical molds and a large-size injection unit for injecting the resin to the respective molds are necessary, thereby considerably increasing costs for production facilities. The OCI method actually requires a high cost exceeding an upper limit of desired production cost, so that it becomes extremely difficult to adopt the OCI method.

As a result of the present inventors' earnest studies for solving the above-mentioned problems in prior arts, it has been found that in an injection-molding apparatus comprising an injection machine and a mold unit, by providing a holding means comprising a plural of chucks, disposed adjacent to the mold unit having a cavity (or cavities) for removing the molded product from the mold unit, wherein the ratio of the number of the chuck to the number of the cavity of the mold unit is set to a value not less than the ratio of operation time of each chuck to operation time of the mold unit, not only the reduction of costs for production facilities and the shortening of an injection-molding cycle time can be achieved, but also the effective prevention of the deformation of the molded product can be attained. On the basis of the above-mentioned finding, the present invention has been achieved.

SUMMARY OF THE INVENTION

It is an object of the present invention to provide an injection-molding apparatus, which are capable of not only reducing costs for production facilities and shortening an injection-molding cycle time, thereby achieving a high productivity, but also effectively preventing deformation of the molded product, and a method for injection-molding a molding material using such an apparatus.

It is another object of the present invention to provide an injection-molding apparatus, which are capable of shortening an operation time in a mold while ensuring a sufficient time for cooling a molded product, thereby producing electronic parts having a high dimensional accuracy without deformation, such as magnet rolls, and a method for injection-molding a molding material using such an apparatus.

To accomplish the aim, in a first aspect of the present invention, there is provided an injection-molding apparatus comprising:

an injection machine;
a mold unit connected to the injection machine and constituted by separable molds which constitutes therein a cavity for forming a molded product; and
a holding means disposed adjacent to the mold unit for removing the molded product from the mold unit, comprising a plural of chucks adapted to advance into and retreat from a region defined between the opened molds of the mold unit,
the molded product being subjected to a primary cooling in the cavity of the mold unit and then being subjected to a secondary cooling after removed from the mold unit, and
the ratio of the number of the chuck to the number of the cavity of the mold unit being set to a value not less than the ratio of operation time of each chuck to operation time of the mold unit.

In the second aspect of the present invention, there is provided an injection-molding apparatus comprising:

an injection machine;
a mold unit connected to the injection machine and constituted by separable molds which constitutes therein a cavity for forming a molded product; and a holding means disposed adjacent to the mold unit for removing the molded product from the mold unit, comprising a plural of chucks adapted to advance into and retreat from a region defined by the opened molds of the mold unit, the molded product being subjected to a primary cooling in the cavity of the mold unit held at the closed position and then being subjected to a secondary cooling after removed from the mold unit, to form a substantially bar-like magnet roll comprising a thermoplastic resin and an inorganic filler, and ratio of the number of the chuck to the number of the cavity being set to a value not less than a ratio of operation time of each chuck to operation time of the mold unit; each of the chucks comprising a pair of blocks being opposed to each other and each having a grasping surface which can be brought into a face contact with an outer peripheral surface of the molded product; and each of the blocks being provided therein with a circulating path through which a heating medium is passed to cool the grasping surface.

In a third aspect of the present invention, there is provided a method for injecting molding a molding material, comprising:

injecting the molding material comprising a thermoplastic resin and an inorganic filler from an injection unit into a cavity of a mold unit to form a molded product;

subjecting the molded product to a primary cooling in the cavity;

removing the molded product from the mold unit using chucks as a holding means; and subjecting the molded product to a secondary cooling while holding the molded product by the chucks, the ratio of the number of the chuck to the number of the cavity being set to a value not less than the ratio of operation time of each chuck to operation time of the mold unit.

DETAILED DESCRIPTION OF THE PREFERRED EMBODIMENTS

In the injection-molding apparatus of the present invention, by controlling the ratio between the number of the chuck and the number of the cavity of the mold unit to a value not less than the ratio between the operation times of the mold unit and each chuck, it is possible to eliminate an idling time of the mold unit and assure a sufficient time for cooling the molded product in the holding means.

In the injection-molding apparatus of the present invention, in order to more effectively conduct the injection-molding, it is preferred to use a injection machine comprising a kneader for melting and kneading a molding material, and an injection unit for injecting the kneaded material in cavities of the mold unit while keeping the kneaded material in a molten state.

In addition, in the injection-molding apparatus of the present invention, it is preferred that in order to more effectively cool the molded product removed, each of the chucks comprising a pair of blocks being opposed to each other and each having a grasping surface which can be brought into a close face contact with an outer peripheral surface of the molded product, and each of the blocks be provided therein with a circulating path through which a heating medium is passed to cool the grasping surface.

Further, the injection-molding apparatus of the present invention can be especially suitably applied to the production of a molded product made of a specific molding material. As the molding material, there may be used materials comprising at least one thermoplastic resin selected from the group consisting of a polyamide resin, a polyphenylene sulfide resin, an ethylene-ethyl acrylate resin, an ethylene-ethyl methacrylate resin, a liquid crystalline polymer and a chlorinated polyethylene resin, and at least one inorganic filler selected from the group consisting of ferrite particles such as hard ferrite particles or soft ferrite particles, iron oxide particles, and iron metal particles. As the molded product, there may be exemplified a substantially bar-like magnet roll.

Figure 4A:
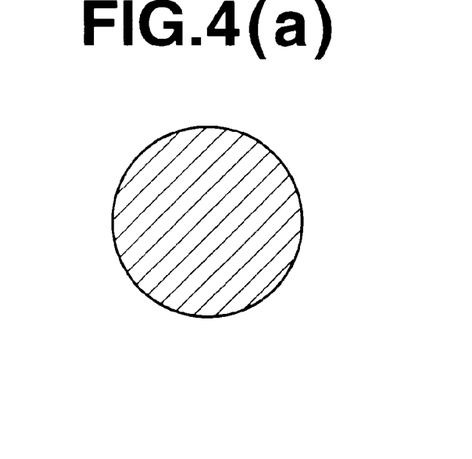
FIGS. 4(a) to FIG. 4(c) are cross-sectional views of various molded products having an approximately bar-like shape, taken along the direction perpendicular to an axial direction of each molded product.
Figure 4B:
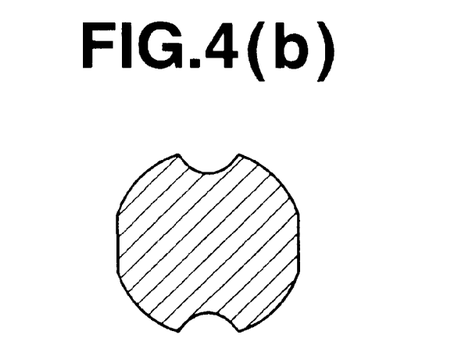
Figure 4C:
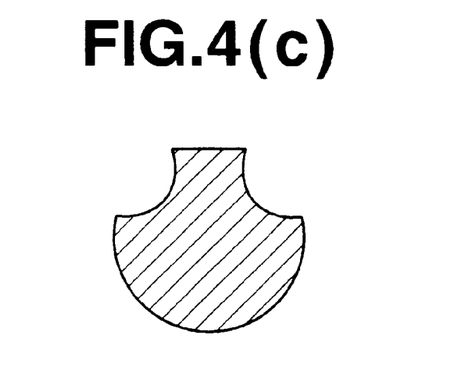

The magnet roll is an electronic part used in electrophotographic machines, printers or the like, and can be produced by molding the molding material into approximately bar-like products having various cross-sectional shapes, as shown in FIG. 4(a) to FIG. 4(c). In case of relative small-size magnet rolls, the size of the magnet rolls may be, for example, a maximum diameter of about 8 to about 11 mm and a length (axial length) of about 210 to about 260 mm.

In the method for injection-molding the molding material according to the present invention, by controlling the ratio between the number of the chuck and the number of the cavity of the mold unit to a value not less than the ratio between the operation times of the mold unit and each chuck, it is possible to eliminate an idling time of the mold unit and assure a sufficient time for cooling the molded product in the holding means.

Further, in the injection-molding method of the present invention, it is preferred that in order to continuously conduct the molding method, an apparatus comprising a kneader and an injection unit is used as the injection machine, a molding material is melted and kneaded in the kneader, and the obtained kneaded material is injected from the injection unit into a cavity (or cavities) of the mold unit while keeping the kneaded material in a molten state.

Further, in the injection-molding method of the present invention, when the molded product is removed from the mold unit, it is preferred to control the difference between the temperature of the mold unit and the temperature of the holding means to 0 to 50° C. by circulating a heating medium through the chucks. In accordance with such a preferred embodiment, the molded product removed from the mold unit can be more effectively cooled while preventing deformation thereof.

The preferred embodiment of the injection-molding apparatus according to the present invention will be explained by referring to FIGS. 1 to 5.

Figure 1:
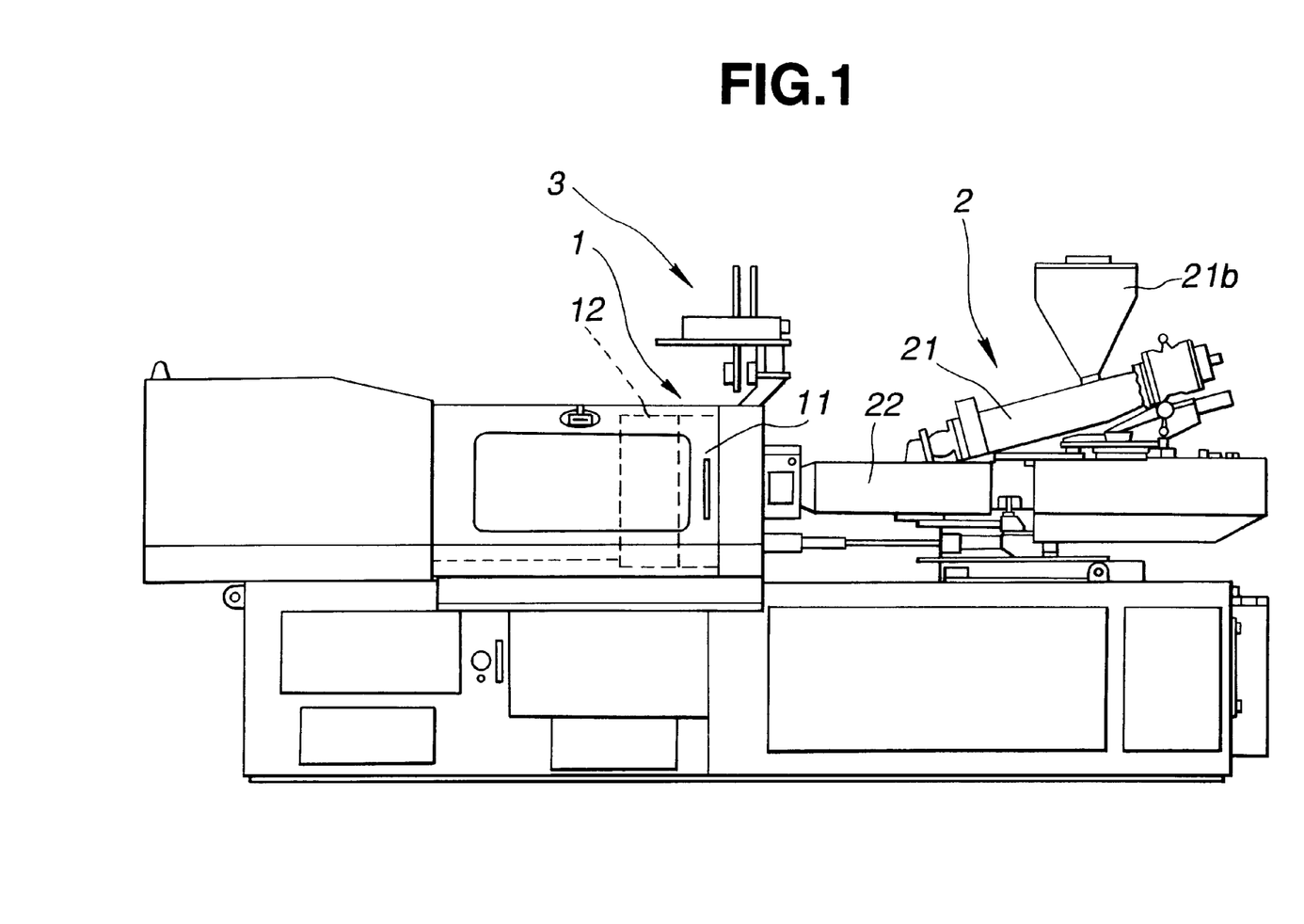
FIG. 1 is a side view schematically showing an injection-molding apparatus according to the present invention.

As shown in FIG. 1, the injection-molding apparatus according to the present invention is adapted to subject an injection-molded product to a primary cooling while keeping the molded product in cavities of a mold unit 1. Thereafter, the molded product is removed from the mold unit 1 and then subjected to a secondary cooling.

As shown in FIG. 1, the injection-molding apparatus according to the present invention comprises a mold unit 1 constituted by separable molds, which constitutes cavities therein, an injection machine 2 connected to the mold unit 1, and a holding means 3 disposed adjacent to the mold unit 1 for removing the obtained molded product from the mold unit 1. The mold unit 1 may be constituted by vertically separable upper and lower molds. However, it is preferred that in order to simplify the structure for removal of the molded product, the mold unit 1 be constituted by horizontally separable right and left molds.

The injection machine 2 comprising a kneader for melting and kneading a molding material, and an injection unit for injecting the kneaded material into the mold unit 1 while keeping the kneaded material in a molten state, for example, as described in Japanese Patent Publication (KOKOKU) No. 7-106586(1995). In such an injection machine 2, a kneader 21 and an injection unit 22 may be used in combination, so that it is possible to continuously conduct a series of operations from melting and kneading of the molding material up to injection thereof. By adopting such a machine, the molding operation can be more effectively conducted.

The kneader 21 of the injection machine 2 comprises a cylinder provided on its outer periphery with a heater, a hopper 21b arranged on a rear end side of the cylinder for feeding a raw molding material into the cylinder, a discharge nozzle attached to the front end (tip end) of the cylinder for discharging the kneaded material therefrom, and a screw inserted into the cylinder for delivering the kneaded material. The molding material is fed through the hopper 21b into the cylinder, and heated and melted therein. The molten molding material is then kneaded and transported by driving the screw, and discharged through the discharge nozzle into the injection unit 22. In addition, the injection unit 22 comprises a casing provided on its outer periphery with a heater, a vent port formed on a rear end of the casing, an injecting nozzle disposed on a front end (tip end) of the casing, and a screw inserted into the casing for pressurizing the kneaded material. The kneaded material, i.e., molten molding material is supplied through the discharge nozzle of the kneader 21 into the injection unit 22, and a predetermined amount of the molten molding material is intermittently injected by the rotation, and advance and retreat operations of the screw.

As shown in FIG. 1, the mold unit 1 is constituted by a stationary mold 11 and a movable mold 12. When closed in a mating manner, these molds constitute (form) therein a cavity corresponding to an outer shape of a magnet roll to be molded. That is, the mold unit 1 used herein has an approximately similar structure to those of known mold units, and is sequentially formed on an inside thereof with a runner, a gate and a mold cavity. The runner is connected with the nozzle of the injection unit 22 which is disposed so as to contact a base end (a side wall) of the stationary mold 11.

Incidentally, a plurality of the cavities is formed in the mold of the mold unit 1 as occasion demands. In the case where relatively small products such as magnet rolls are to be molded, for example, two mold cavities to which the molding material can be simultaneously injected by a branched runner formed in the mold of the mold unit 1.

Further, a flowing path for heating medium to control the temperature thereof are also formed in the molds. For example, the temperature of the molds can be controlled by the heating medium to about 90 to about 120° C.

In addition, the movable mold 12 which can be advanced to and retreated from the stationary mold 11, is provided at its rear (base) end with an ejector pin capable of projecting toward the stationary mold upon opening of the molds to separate the molded magnet roll from the movable mold 12. Further, a exciting device, for example, a permanent magnet is disposed and embedded in the molds to apply a magnetic force to the molded magnet roll for magnetization thereof. In general, in view of shape of the magnet roll and direction of magnetic field applied thereto, a plurality of permanent magnets may be arranged so as to surround the cavity.

Figure 2A:
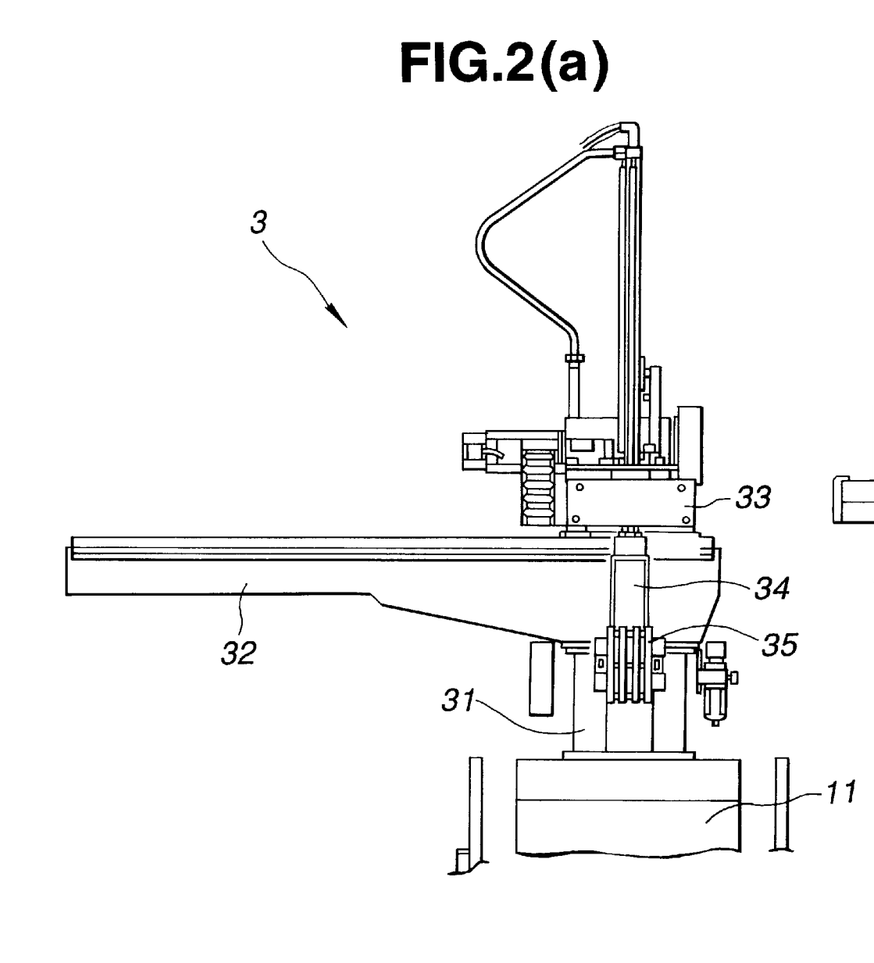
FIG. 2(a) is a side view showing a whole structure of a holding means according to the present invention.
Figure 2B:
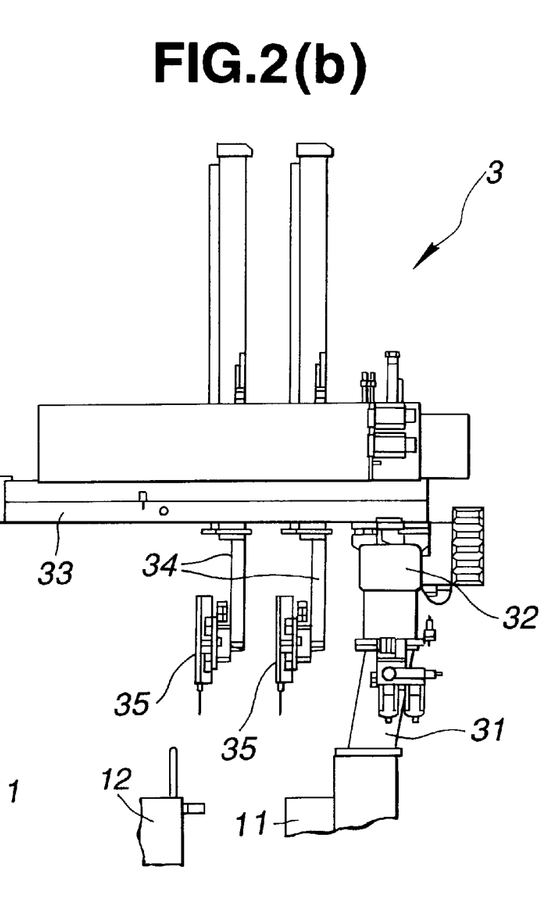
FIG. 2(b) is a front view of the holding means shown in FIG. 2(a)

As shown in FIG. 2, the holding means comprises a plural of chucks which can be advanced to and retreated from a region formed between the molds of the mold unit 1 held in the opened position. Specifically, the holding means is constituted by a hand mechanism 3. The hand mechanism 3 comprises a support 31 uprightly provided at a side of the stationary mold 11 of the mold unit 1; a first horizontal linear guide 32 provided at an upper end of the support 31; a second horizontal linear guide 33 mounted horizontally movably onto the first linear guide 32 and extending in the direction perpendicular to the first linear guide 32; two sets of arms 34 mounted horizontally movably onto the second linear guide 33 and extending downwardly therefrom; and two sets of chucks 35 provided at a lower end of each arm 34 and rotatable around a horizontal axis.

More specifically, the chucks 35 are initially held above the mold unit 1 in its stand-by position, and by the combination of operations including horizontal movement of the second linear guide 33, horizontal movement and up and down movement of the two sets of arms 34 and rotational movement of the chucks 35, the chucks 35 are lowered and advanced into the region defined between the stationary mold 11 and movable mold 12 of the mold unit 1 which is held in the opened position, to grasp the molded magnet roll and transport the grasped magnet roll to the predetermined stand-by position.

Figure 3A:
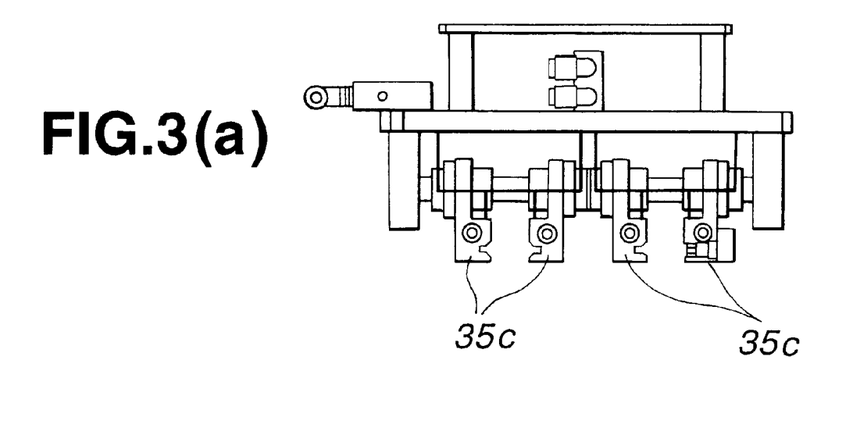
FIG. 3(a) is a plan view showing one preferred embodiment of chucks of the holding means according to the present invention.
Figure 3B:
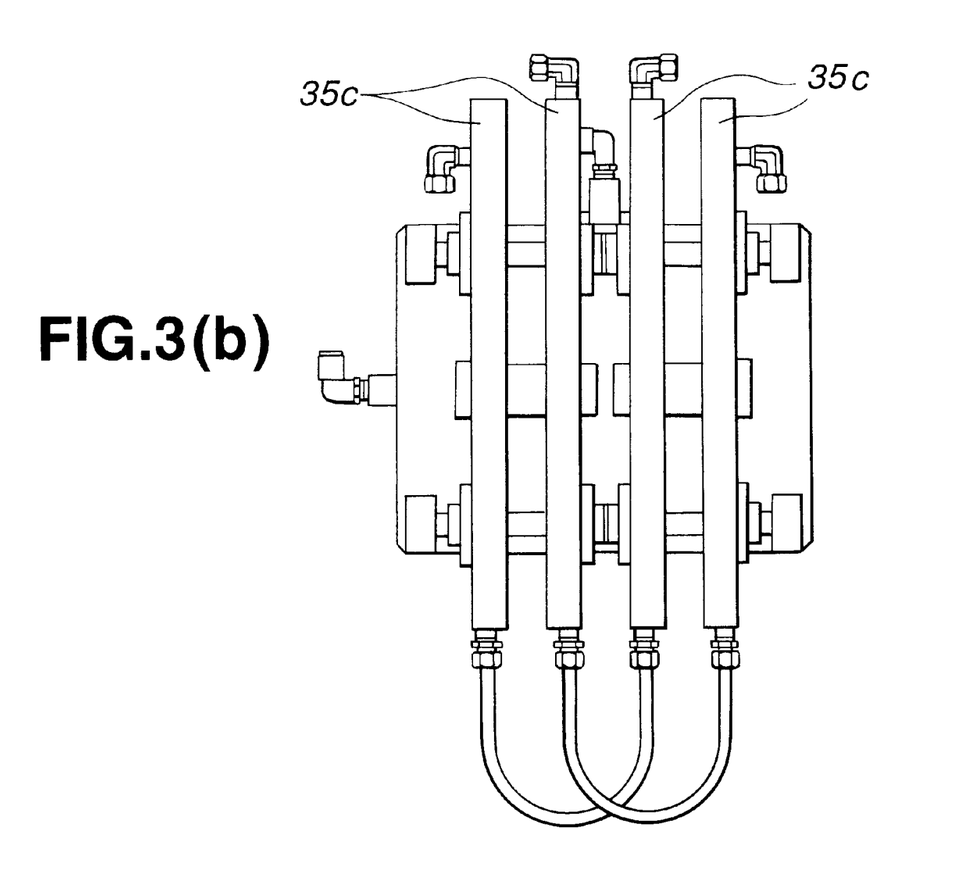
FIG. 3(b) is a front view of the chucks shown in FIG. 3(a)

The number of the chuck 35 is determined depending upon the number of the cavity, for example, in case of this embodiment, there are provided four chucks per two cavities in the mold. The two chucks 35 arranged on each arm 34 are adapted to rotate in association with the movement of each arm 34 by the operation of a cylinder unit mounted to a tip end of the arm 34. Further, as shown in FIG. 3, each chuck 35 is constituted by a pair of elongated blocks 35c such that longitudinal side surfaces thereof are opposed to each other. Each block 35c is attached to a guide bar and a cylinder unit which is reciprocally moveable in the direction perpendicular to the longitudinal direction of the block, so that the pair of blocks 35c can be moved so as to approach mutually or separate away from each other.

Further, in order to surely grasp or hold the magnet roll (molded product) and effectively cool the grasped magnet roll, a pair of the blocks 35c have grasping surfaces on opposed sides thereof, which grasping surfaces extend over a whole length of the molded magnet roll to be grasped and have such a shape capable of contacting with an outer peripheral surface of the molded magnet roll. In addition, each block 35c is formed therein with a circulating path through which a heating medium is passed to cool the grasping surface thereof.

For example, in the case where a cylindrical magnet roll is produced, the grasping surface on each block 35c of the chuck 35 has such a shape which allows the grasping surface to contact with an outer peripheral surface of the cylindrical body as evenly as possible when the two blocks 35c of the chuck 35 are caused to approach one another in order to grasp the cylindrical body. More specifically, in the case where a cylindrical magnet roll as shown in FIG. 4(a) is produced, the grasping surface of the chuck 35 is formed by a notch or recess having an approximately triangular or semi-circular shape in cross section taken along the direction perpendicular to a longitudinal axis of the cylindrical molded product. The maximum opening width of the notch or recess on the grasping surface may be approximately identical with a diameter of the magnet roll. When the grasping surface is formed by the notch or recess having such a maximum opening width, the magnet roll can be surely grasped, even immediately after molded.

In the apparatus according to the present invention, in order to eliminate an idling time of in-mold operation during the injection-molding process, the ratio of the number of chucks 35 to the number of the cavity in the mold unit 1 is set to a value not less than the ratio of the operation time of the chuck 35 to the operation time of the mold unit 1. In general, the number of the cavity in the mold unit 1 may be determined depending upon aimed output of molded products, and the number of chucks 35 may be determined depending upon the number of the cavity. The operation time of the mold unit 1 means a total time required for conducting respective in-mold operations including a clamping step, an injecting and dwelling step, a primary cooling step in mold, a mold-opening step and a removing step of the molded product from the mold. The operation time of the chuck 35 means a total time required for conducting operations subsequent to the removal of molded product up to secondary cooling in the chuck 35.

For example, assuming that the operation time (T1) in the mold unit 1 is about 40 seconds and the operation time (T2) in each chuck 35 is about 70 seconds, the ratio (T2/T1) therebetween is 70/40. Accordingly, the ratio (S2/S1) of the number (S2) of the chucks to the number (S1) of the cavity is set to a value not less than the T2/T1 ratio (70/40). If the number (S1) of the cavity is 2 sets, the number of the chuck 35 is set to not less than 3.5 sets, i.e., at least 4 sets.

Thus, by setting the ratio (S2/S1) between the number of the chuck and the number of the cavity to a value not less than the ratio (T2/T1) between the operation times of the mold unit 1 and each chuck 35, it is possible to continuously operate the mold unit 1. However, when the ratio (S2/S1) between the number of the chuck and the number of the cavity is set to a value excessively larger than the ratio (T2/T1) between the operation times of the mold unit and each chuck, i.e., when the number of the chuck 35 is too large relative to the number of the cavity, the cost required for production facilities may be disadvantageously increased. Therefore, it is most preferred that the ratio (S2/S1) between the number of the chuck and the number of the cavity be set to as close a value as possible, to the ratio (T2/T1) between the operation times of the mold unit and each chuck.

Figure 5:
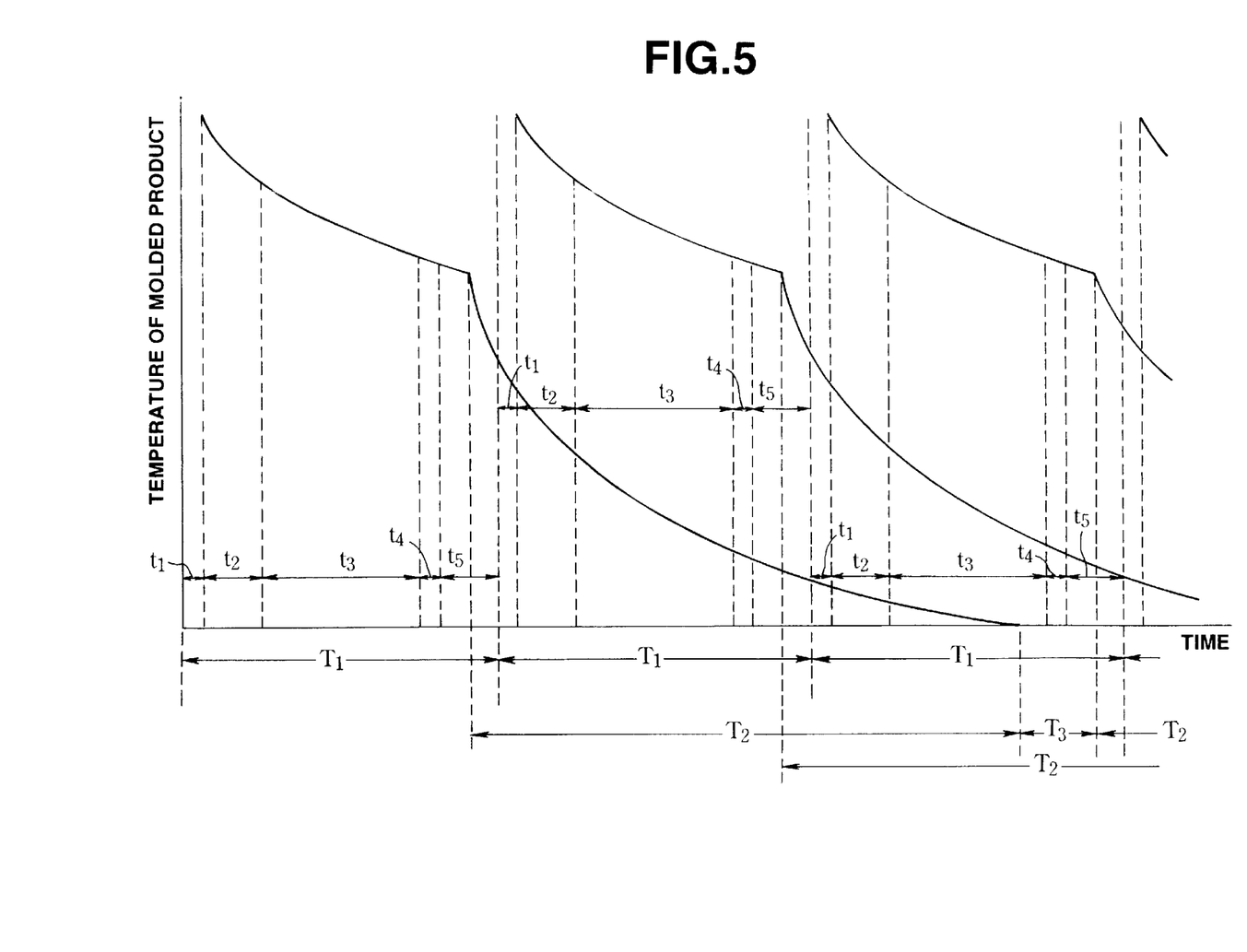
FIG. 5 is a flow diagram showing respective operations of an injection-molding process according to the present invention, by means of the relationship of the temperature of a molded product and time.

Next, the injection-molding process using the above-mentioned injection-molding apparatus in accordance with the present invention, will be explained by referring to FIG. 5 in addition to FIGS. 1 to 4. First, the above-mentioned molding material comprising a thermoplastic resin and an inorganic filler is fed through the hopper 21b into the kneader 21 of the injection machine 2. In the case where a magnet roll is produced, the molding material to be fed contains, for example, a nylon 6 resin and ferrite magnetic particles.

In the kneader 21 of the injection machine 2, the molding material is melted by operating the heater mounted on an outer periphery of the cylinder thereof. The molten molding material is kneaded and delivered by the screw in the cylinder, and then discharged through the discharge nozzle into the injection unit 22. Incidentally, the temperature of the molten molding material when kneaded may be about 290° C.

When the molding material (kneaded material) is fed to the injection unit 22, the heater provided on an outer periphery of the casing of the injection unit 22 is operated to keep the molding material (kneaded material) in a molten state. The screw in the casing is rotated in backward operational mode to temporarily store the molding material (kneaded material) in a tip end portion of the casing. At a predetermined timing, the rotation of the screw is reversed, and the screw is driven in forward operational mode to discharge therefrom a predetermined amount of the molding material under pressure. By such storage and discharge operations by the screw, a predetermined amount of the molding material can be injected into the mold unit held in the closed position while keeping the molding material in a molten state. Incidentally, the temperature of the molds of the mold unit 1 is preliminarily maintained at about 110° C. upon the injection.

After the molding material is injected from the injection unit 22 into 2 sets of cavities of the mold unit 1, the obtained molded product is subjected to primary cooling in the mold unit 1. The time required for the primary cooling after the injection may be determined according to volume or surface area of the molded product and mold temperature. For example, when the molded product is produced from the above-mentioned molding material, the primary cooling time is about 20 to about 30 seconds. Further, in the mold unit 1, the molded product can be magnetized by permanent magnets disposed so as to surround each cavity, during the primary cooling, thereby obtaining a magnet roll.

Next, the magnet roll (molded product) is removed from the mold unit 1 by 2 sets of chucks 35 as a holding means, which are arranged on one of 2 sets of the arms 34. The thus removed magnet roll is subjected to secondary cooling while being held by the chucks 35. Incidentally, upon the secondary cooling, the temperature of the blocks 35c of the chuck 35 may be preliminarily adjusted to about 70° C. to about 90° C. by the heating medium. More specifically, the temperature of such chucks 35 is controlled such that the difference in temperature between the chucks 35 and the mold unit 1 falls in the range of 0 to 50° C.

Specified operations for removal of the molded product are as follows. That is, when the mold unit 1 is opened, the chucks 35 disposed thereabove in a stand-by state is lowered and advanced to the region defined between the opened molds by operations of the first linear guide 32, the second linear guide 33 and the arms 34 and rotational operation of the chucks 35. By these operations, a pair of blocks 35c of each chuck 35 which has been preliminarily kept in an opened state, are respectively positioned on opposite sides of the magnet roll projected into the region defined between the opened molds. The pair of blocks 35c of each chuck 35 are caused to approach one another by the operation of the cylinder unit, so that the magnet roll is grasped therebetween.

The chucks 35 grasping the magnet roll is then moved back or retreated to the initial stand-by position. Since each block 35c of the chuck 35 is formed thereon with the grasping surface capable of contacting with the outer peripheral surface of the magnet roll and provided therein with a circulating path for heating medium, the magnet roll grasped by the chuck 35 can be effectively subjected to secondary cooling without generating internal strain therein.

On the other hand, after the molded magnet roll is removed by operating the chucks 35, the mold unit 1 is immediately closed and clamped, and the injection operation is carried out again in the same manner as described above. Similarly, after the molded product is subjected to the primary cooling in the mold unit, the obtained magnet roll is removed from the mold unit 1 by using the chucks 35 or the like and then subjected to the secondary cooling while being held by the chucks 35.

That is, in the apparatus according to the present invention, by controlling the ratio S2/S1 between the number of the chuck 35 and the number of cavity in the mold unit 1, and the ratio T2/T1 between the operation times of the mold unit 1 and each chuck 35, so as to establish the above-specified relationship therebetween, it becomes possible to continuously conduct the in-mold operations including a clamping step, an injecting and dwelling step, a primary cooling step, a mold-opening step and removing step of molded product from the mold, and further reduce the time required for cooling the molded product. In other words, in accordance with the present invention, an idling time (dead time) of the mold unit 1 can be effectively eliminated, and a sufficient time for cooling the magnet roll (molded product) in the chucks 35 can be assured. Therefore, by using the apparatus according to the present invention, it is possible to effectively produce electronic parts such as magnet rolls with a high dimensional accuracy without deformation thereof.

As described above, in the process according to the present invention, the molding material comprising a thermoplastic resin and an inorganic filler is injected from the injection machine 2 into cavity (or cavities) of the mold unit 1 to form a molded product, followed by subjecting the molded product to primary cooling in the mold unit 1. Thereafter, the obtained molded product is removed from the mold unit 1 using the chucks 35 as a holding means and then subjected to secondary cooling while being held by the chucks 35. In such a process of the present invention, by setting the ratio of the number of the chuck 35 to the number of the cavity of the mild unit 1 to a value not less than the ratio of the operation time of each chuck 35 to the operation time of the mold unit 1, it becomes possible to effectively produce electronic parts such as magnet rolls with a high dimensional accuracy without deformation thereof.

Also, in the injection-molding process according to the present invention, there is used the injection machine 2 comprising the kneader 21 and the injection unit 22. The molding material is melted and kneaded in the kneader 21, and the obtained kneaded material is injected from the injection unit 22 into cavity (or cavities) of the mold unit 1 while keeping the kneaded material in a molten state, thereby more effectively conducting the injection-molding process. Further, when the molded product is removed from the mold unit 1, the difference between the temperature of the mold unit 1 and the temperature of the chucks 35 is controlled to 0 to 50° C. by passing the heating medium through the circulating path in the chucks 35, thereby producing such a molded product having much less internal strain.

Meanwhile, in the present invention, the number of the cavity in the mold unit 1 is not limited to two, but one cavity or not less than three cavities may be provided, as far as the number of the chuck 35 can satisfy the above-specified relationship.

As described above, in accordance with the present invention, when a molding material comprising a thermoplastic resin and an inorganic filler is subjected to injection-molding to form a molded product, the ratio of the number of holding means to the number of the cavity of the mold unit is set to the specified value to reduce an idling time of the mold unit. Accordingly, it becomes possible to reduce costs for production facilities and shorten the injection-molding cycle time, resulting in increased productivity. Further, the molded product which has been subjected to primary cooling in the mold unit is grasped by the holding means and removed from the mold unit, and then subjected to secondary cooling for a sufficient period of time while being held by the holding means, thereby preventing occurrence of internal strain in the molded product even after molded, and effectively preventing deformation of the molded product. Accordingly, the present invention is usefully applied to the production of electronic parts such as magnet rolls which are required to have a high dimensional accuracy.

EXAMPLES

The present invention will be described in more detail by Example, but the Example is not intended to limit the scope of the present invention.

The degree of deformation (degree of warpage or bend) of a molded product was measured in the following manner. After an outer diameter of the molded product was measured, the molded product was rotated in parallel laser beam to measure a maximum rotational outer diameter thereof. The difference between the maximum rotational outer diameter and the static outer diameter of the molded product was calculated and determined as the degree of deformation thereof. In the present invention, it is preferred that the degree of deformation (difference) of the molded product be not more than 100 $\mu$m.

Example 1

Using the injection-molding apparatus shown in FIG. 1, 89 parts by weight (89.0% by weight) of magnetic particles prepared by treating bond magnet ferrite particles "MA951" (produced by TODA KOGYO CORP.) with 0.5 part by weight of a silane coupling agent "A-1120" (produced by NIPPON UNICAR CO., LTD.) was mixed with 11 parts by weight (10.9% by weight) of nylon-6 particles "P101F" (produced by UBE KOSAN CO., LTD.) as a thermoplastic resin, and 0.1 part by weight (0.1% by weight) of a metal salt of stearic acid as a lubricant. The mixture was kneaded at a resin temperature of 290° C. using a KCK kneader ("100-35VEX-6", manufactured by KCK CORP.) as the kneader 21. Next, using an injection-molding machine ("140-ton model", manufactured by NISSEI RESIN CO., LTD.), the kneaded material was injected into a mold having two cavities, in which the temperature thereof is maintained at 110° C., thereby obtaining a cylindrical molded product having a diameter of about 0.96 cm and a length of about 22 cm. As the mold, there was used such a mold into which a plural of permanent magnets was incorporated along the longitudinal direction thereof such that a plural of magnetic poles was formed along the longitudinal direction of the molded product.

The respective operation times in the mold unit 1 during the injection-molding process were as follows:

clamping step (t1): about 2 seconds;

injecting/dwelling step (t2): about 6 seconds;

in-mold cooling step (primary cooling step) (t3): about 25 seconds;

mold-opening step (t4): about 2 seconds; and removing step of the molded product (t5): about 6 seconds.

The first total operation time (first molding cycle time:T1) was about 41 seconds.

The molded product was grasped by the first chucks 35 made of aluminum and maintained at 80° C. (difference between the temperature of the chucks 35 and that of the mold unit 1 was 30° C.), and removed from the mold unit 1. Next, by being allowed to stand at a room temperature or gradually decreasing the temperature of heating medium circulated through the chucks 35, the grasped molded product was cooled for about 72 seconds (operation time of the first chucks 35:T2), thereby obtaining a magnet roll.

On the other hand, in the mold unit from which the molded product was already removed by the first chucks 35, the second injection-molding operation including a clamping step, an injecting/dwelling step, an in-mold cooling (primary cooling) step, a mold-opening step and a removing step of molded product from the mold was conducted for the same operation time as that of the first operation. Next, the obtained molded product was grasped by the second chucks 35 and removed from the mold unit 1. Further, the molded product grasped by the second chucks 35 was cooled in the same manner as described above with respect to the first chucks 35, thereby obtain a magnet roll.

Successively, in the mold unit 1 from which the molded product was already removed by the second chucks 35, the third injection-molding operation including a clamping step, an injecting/dwelling step, an in-mold cooling (primary cooling) step, a mold-opening step and a removing step of molded product from the mold was conducted for the same operation time as those of the first or second operations. Next, the molded product was grasped by the first chucks 35 which was already kept in a stand-by position (stand-by time (T3): about 10 seconds) after completion of cooling the molded product obtained in the first injection-molding operation, and then the molded product was cooled while being held by the first chucks 35, thereby obtaining a magnet roll. An average degree of deformation of the thus obtained 20 magnet rolls was 78 μm.

What is claimed is:

1. A method for injection-molding a molding material, which method comprises:

(a) injecting a molding material comprising a thermoplastic resin and in inorganic filler from an injection unit into a cavity of a mold unit to form a molded product;

(b) subjecting said molded product to a primary cooling in said cavity;

(c) removing said molded product from said mold unit using chucks as a holding means while circulating a heating medium through said chucks to control a difference between a temperature of said mold unit and a temperature of said holding means to 0 to 50° C.; and (d) subjecting said molded product to a secondary cooling while holding said molded product by said chucks, wherein the ratio of the number of said chucks to the number of said cavities is set to a value not less than a ratio of an operation time of each chuck to an operation time of said mold unit.

2. A method according to claim 1, wherein said injection machine comprises a kneader for melting and kneading a molding material for said molded product, and an injection unit for injecting the kneaded material into said cavities while maintaining said kneaded material in a molten state.

3. A method according to claim 1, wherein said molding material for the molded product comprises at least one thermoplastic resin selected from the group consisting of a polyamide resin, a polyphenylene sulfide resin, an ethylene-ethyl acrylate resin, an ethylene-ethyl methacrylate resin, a liquid crystalline polymer and a chlorinated polyethylene resin, and at least one inorganic filler selected from the group consisting of ferrite particles, iron oxide particles and metal particles.

4. A method according to claim 3, wherein said molded product is a substantially bar-shaped magnet roll.

5. An injection-molding apparatus comprising:

an injection machine;

a mold unit connected to said injection machine and comprising separable molds, which constitutes therein a cavity for forming a molded product; and a holding means disposed adjacent to said mold unit for removing said molded product from said mold unit, comprising a plurality of chucks adapted to advance into and retreat from a region defined between the opened molds of the mold unit, said molded product being subjected to a primary cooling in the cavity of said mold unit and then subjected to a secondary cooling after removal from the mold unit, the ratio of the number of said chucks to the number of said cavities being set to a value not less than a ratio of an operation time of each chuck to an operation time of said mold unit, each of said chucks comprising a pair of blocks being opposed to each other and each having a grasping surface which can be brought into a face contact with an outer peripheral surface of said molded product, and each of said blocks being provided therein with a circulating path through which a heating medium is passed to cool said grasping surface.

6. An injection-molding apparatus according to claim 5, wherein said injection machine comprises a kneader for melting and kneading a molding material for said molded product, and an injection unit for injecting the kneaded material into said cavities while maintaining said material in a molten state.

7. An injection-molding apparatus according to claim 5, wherein said molding material for the molded product comprises at least one thermoplastic resin selected from the group consisting of a polyamide resin, a polyphenylene sulfide resin, an ethylene-ethyl acrylate resin, an ethylene-ethyl methacrylate resin, a liquid crystalline polymer and a chlorinated polyethylene resin, and at least one inorganic filler selected from the group consisting of ferrite particles, iron oxide particles and metal particles.

8. An injection-molding apparatus according to claim 7, wherein said molded product is a substantially bar-shaped magnet roll.

9. An injection-molding apparatus comprising:

an injection machine;

a mold unit connected to said injection machine and comprising separable molds, which constitutes therein a cavity for forming a molded product; and a holding means disposed adjacent to said mold unit for removing said molded product from said mold unit, comprising a plurality of chucks adapted to advance into and retreat from a region defined between said molds of the mold unit, said molded product being subjected to a primary cooling in the cavity of said mold unit held in a closed position and then to a secondary cooling after removal from the mold unit, to form a substantially bar-shaped magnet roll comprising a thermoplastic resin and an inorganic filler, the ratio of the number of said chucks to the number of the cavities being set to a value not less than a ratio of an operation time of each chuck to an operation time of said mold unit, each of said chucks comprising a pair of blocks being opposed to each other and each having a grasping surface which can be brought into a face contact with an outer peripheral surface of said molded product, and each of said blocks being provided therein with a circulating path through which a heating medium is passed to cool said grasping surface.

* * * * *